(12) United States Patent
Yoshizaki et al.

(10) Patent No.: US 9,970,349 B2
(45) Date of Patent: May 15, 2018

(54) PORTABLE WORKING MACHINE

(71) Applicants: YAMABIKO CORPORATION, Tokyo (JP); WALBRO LLC, Tucson, AZ (US)

(72) Inventors: Takuo Yoshizaki, Tokyo (JP); Kosuke Matsumoto, Tokyo (JP); Hisato Osawa, Tokyo (JP); Yuuta Kobayashi, Tokyo (JP); Hiroki Ogasawara, Miyagi (JP)

(73) Assignees: Yamabiko Corporation, Tokyo (JP); Walbro LLC, Tucson, AZ (US)

( * ) Notice: Subject to any disclaimer, the term of this patent is extended or adjusted under 35 U.S.C. 154(b) by 47 days.

(21) Appl. No.: 15/093,918

(22) Filed: Apr. 8, 2016

(65) Prior Publication Data

US 2016/0298552 A1 Oct. 13, 2016

(30) Foreign Application Priority Data

Apr. 9, 2015 (JP) ................................. 2015-080432

(51) Int. Cl.
| | |
|---|---|
| *F02B 63/02* | (2006.01) |
| *F01P 1/06* | (2006.01) |
| *F01P 5/02* | (2006.01) |
| *G01K 13/00* | (2006.01) |
| *F04D 29/28* | (2006.01) |
| *F02B 75/02* | (2006.01) |

(52) U.S. Cl.
CPC ............. *F02B 63/02* (2013.01); *F01P 1/06* (2013.01); *F01P 5/02* (2013.01); *F04D 29/282* (2013.01); *G01K 13/00* (2013.01); *F02B 2075/025* (2013.01); *F02D 2200/021* (2013.01); *F02D 2400/06* (2013.01)

(58) Field of Classification Search
CPC ......... F01P 1/06; F01P 5/02; F02D 2200/021; F02D 2400/06; F02B 63/02; F02B 75/02; F02B 2075/025
See application file for complete search history.

(56) References Cited

U.S. PATENT DOCUMENTS

| | | | |
|---|---|---|---|
| 4,901,701 A | * 2/1990 | Chasteen | ................ F02D 37/02 |
| | | | 123/478 |
| 6,314,922 B1 | 11/2001 | Zimmermann et al. | |
| | (Continued) | | |

FOREIGN PATENT DOCUMENTS

| | | | | |
|---|---|---|---|---|
| CN | 201334954 Y | * 10/2009 | ................ F02F 1/00 |
| JP | S56-054940 A | 5/1981 | |

OTHER PUBLICATIONS

Machine translation of CN201334954(Y), Ao X. et al., publ'n date: Oct. 28, 2009, obtained from https://worldwide.espacenet.com/, pp. 1-3.*

*Primary Examiner* — Grant Moubry
(74) *Attorney, Agent, or Firm* — Kilyk & Bowersox, P.L.L.C.

(57) ABSTRACT

To enhance responsivity of temperature sensor detecting an engine temperature. A temperature sensor component 40 includes a metal washer 42. The temperature sensor component 40 transfers the engine temperature to a sensor body 46 via the heat transfer washer 42. A cylinder portion 8 of a cylinder block 64 has two bosses 30. The washer 42 of the temperature sensor component 40 is fixed to the boss 30 together with the electronic control unit 20.

13 Claims, 7 Drawing Sheets

(56) References Cited

U.S. PATENT DOCUMENTS

| | | | | |
|---|---|---|---|---|
| 8,386,149 | B2* | 2/2013 | Bellistri | F02M 49/00 123/470 |
| 8,770,171 | B2* | 7/2014 | Paa | F02D 31/004 123/339.15 |
| 8,960,154 | B2* | 2/2015 | Mason | F02D 35/0069 123/438 |
| 9,140,204 | B2* | 9/2015 | Gorenflo | F02D 35/025 |
| 2010/0147544 | A1 | 6/2010 | Yoshizaki et al. | |
| 2016/0298551 | A1 | 10/2016 | Matsumoto et al. | |

* cited by examiner

PORTABLE WORKING MACHINE

BACKGROUND OF THE INVENTION

The present invention relates to portable working machines. More particularly, the present invention relates to a portable working machine, such as a chain saw, a blower, or a brush cutter, provided with a control unit for performing various controls using an engine temperature as a parameter.

Electronic controllers are currently employed for controlling automobile engines and motorcycle engines. Japanese Patent Laid-Open No. 2000-52280 discloses a chain saw. A portable working machine, such as a chain saw or a brush cutter, typically employs a combination of an air-cooled single cylinder engine and a carburetor. An increasing number of engines applied to this kind of working machine is controlled electronically.

Japanese Patent Laid-Open No. 2010-151125 discloses a working machine that employs an electronic controller for controlling the engine at start of the same. To be more specific, the working machine disclosed in Japanese Patent Laid-Open No. 2010-151125 is provided with a microcomputer. The microcomputer is supplied with electrical power by a power generating mechanism that starts generating electric power as the engine starts up. The microcomputer receives an engine speed signal. Then, the microcomputer performs ignition control of stopping operation of the spark plug when an engine speed immediately after the engine start-up is higher than a predetermined speed.

Japanese Patent Laid-Open No. 56-54940 proposes that a temperature sensing member be installed on a cylinder head for engine control. The temperature sensing member is constituted by a bimetal and a casing. To be specific, the cylinder head has a recess. The temperature sensing member is bolted to the cylinder head, with the bimetal inserted in the recess.

The casing accommodates the bimetal and first and second control valves. The first control valve is used for starter control. The second control valve is used for leak air control. The first and second control valves are directly driven by the bimetal. The starter control valve and the leak air control valve are related to a carburetor. When an engine temperature increases, the first control valve for starter control is shifted toward a closed position, while the second control valve for leak air control is shifted toward an open position. This changes a gas mixture to be supplied to the engine from rich to lean.

Japanese Patent Laid-Open No. 56-54940 discloses a mounting position and a mounting structure of the temperature sensing member formed by combining the two control valves associated with an air passage leading to the carburetor, and the bimetal having the two control valves fixed thereto.

As described above, most automobile engines and motorcycle engines are currently controlled electronically. Single cylinder engines for portable working machines also tend to include electronic control to improve engine performance to be more accurate. For example, electronic control of the portable working machine includes control using an engine temperature as a parameter, typically, fuel amount increasing correction control at the engine start as in Japanese Patent Laid-Open No. 56-54940.

In an air-cooled engine employed in portable working machine, an engine load is related to an engine temperature. That is, the engine temperature increases in a short time in response to an increase in the engine load. In contrast, the engine temperature decreases when there is no engine load. In order to know the engine conditions, the engine temperature is easy to detect. Accordingly, the control using the engine temperature as a parameter is employed in the electronic control of the portable working machine. Examples of the electronic control include fuel amount control in accordance with an engine load during driving.

An object of the present invention is to provide an air-cooled engine that allows a temperature sensor detecting the engine temperature to provide excellent responsivity.

Another object of the present invention is to provide an air-cooled engine that requires reduced assembling and replacement works of the temperature sensor component detecting the engine temperature.

A further object of the present invention is to provide an air-cooled engine that inhibits accidental disconnection of a wire between a temperature sensor and a control unit.

SUMMARY OF THE INVENTION

In order to achieve the above objects, the present invention provides a portable working machine including a control unit controlling the portable working machine using an engine temperature as a parameter, the portable working machine including:
an air-cooled engine body;
a boss formed at a cylinder portion of a cylinder block of the engine body;
a control unit fixed by a bolt fastened to the boss; and,
a temperature sensor component including a heat transfer terminal, the temperature sensor component detecting the engine temperature and supplying the detected engine temperature to the control unit,
in which the heat transfer terminal is interposed between the boss and the control unit, and the heat transfer terminal and the control unit are fixed to the boss by the bolt.

According to the present invention, the temperature sensor component is fixed to the boss that is formed at the cylinder portion of the cylinder block and used for fixing the control unit. This allows the temperature sensor component to directly receive the heat of the engine body in which a combustion chamber is located. In addition, the configuration reduces the distance from the temperature sensor component to the control unit. Further, the configuration provides accessibility to the bolt fastening both the heat transfer terminal of the temperature sensor component and the control unit to the boss.

Other objects, and operations and effects of the present invention will become apparent from the following detailed description of preferable embodiments of the present invention.

DETAILED DESCRIPTION OF THE PRESENT INVENTION

Hereinafter, a preferable embodiment of the present invention will be described based on the attached drawings.

Figure 1:
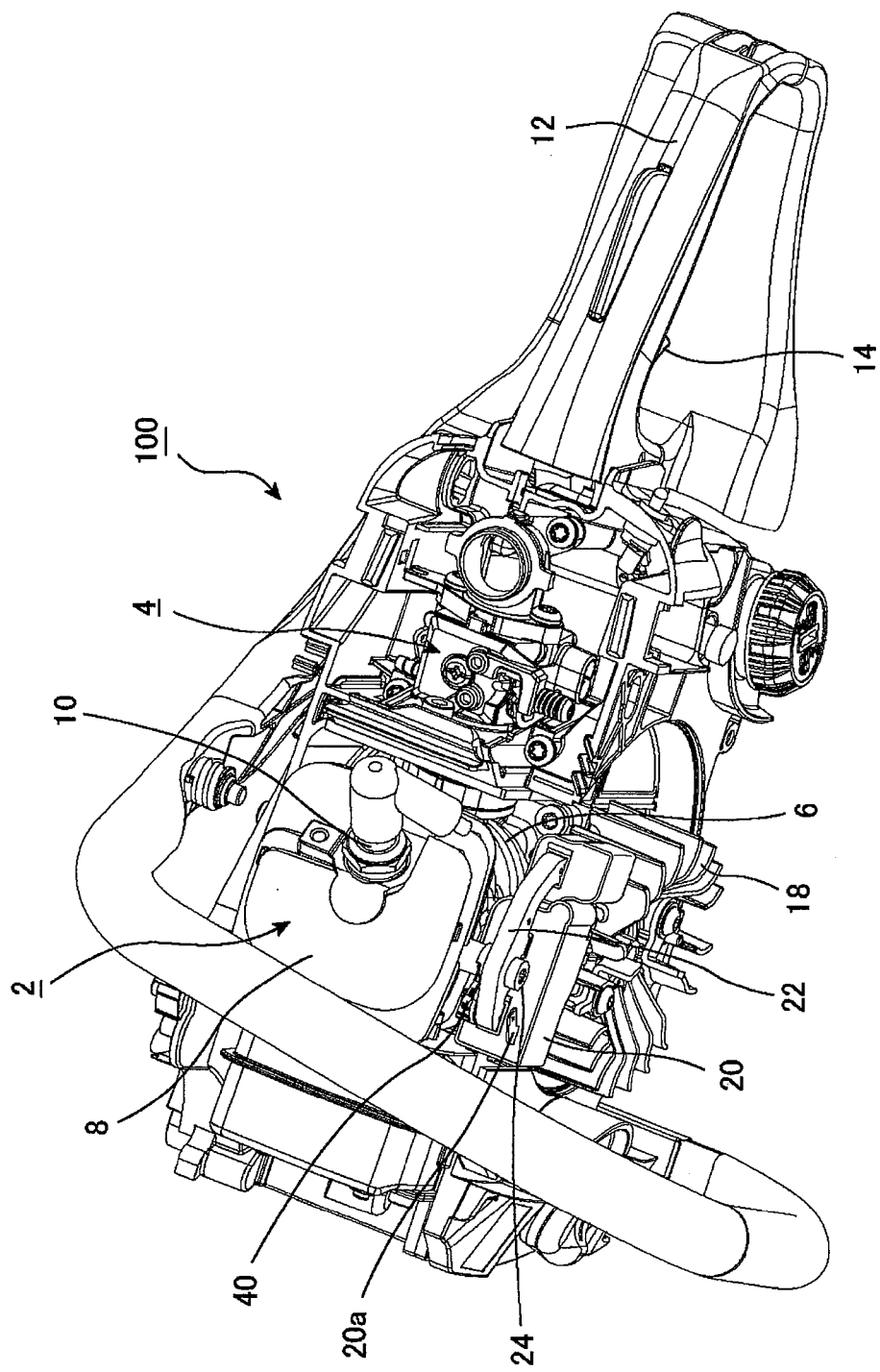
FIG. 1 is a perspective view of a drive portion of a portable working machine to which the present invention is applied.

FIG. 1 shows an embodiment of the present invention. Referring to FIG. 1 showing a drive portion of a portable working machine of the embodiment, with an engine cover covering a part of an engine body removed from the machine, reference numeral 100 denotes the drive portion of the portable working machine. The drive portion 100 in the figure corresponds to a main body of a chain saw. The drive portion 100 includes an engine body 2 and a carburetor 4. The engine body 2 is formed by a 2-stroke internal combustion engine. The 2-stroke internal combustion engine has a single cylinder and is of air-cooled type.

Reference numeral 6 in FIG. 1 denotes air-cooling fins. The air-cooling fins 6 are formed at a cylinder portion 8 of a cylinder block. The cylinder block (denoted by reference numeral 64 in FIG. 8 to be described later) is made of an aluminum alloy. Aluminum alloys, as is well known, have excellent thermal conductivity.

The cylinder portion 8 has a spark plug 10 mounted at a top portion thereof. Although not shown in the figure, the cylinder portion 8 has, on the top portion, a mounting seat provided with a threaded hole that is formed integrally with the cylinder portion 8. At the same time, the spark plug 10 has threads at a tip portion. The spark plug 10, as is well known, is screwed to the mounting seat.

The output of the engine body 2 is controlled by manipulating the throttle lever 14 arranged at the handle 12. A fan rotor 18 is attached to an end of an engine output shaft, that is, a crankshaft (denoted by a reference numeral 16 in FIG. 8 to be described later).

Figure 2:
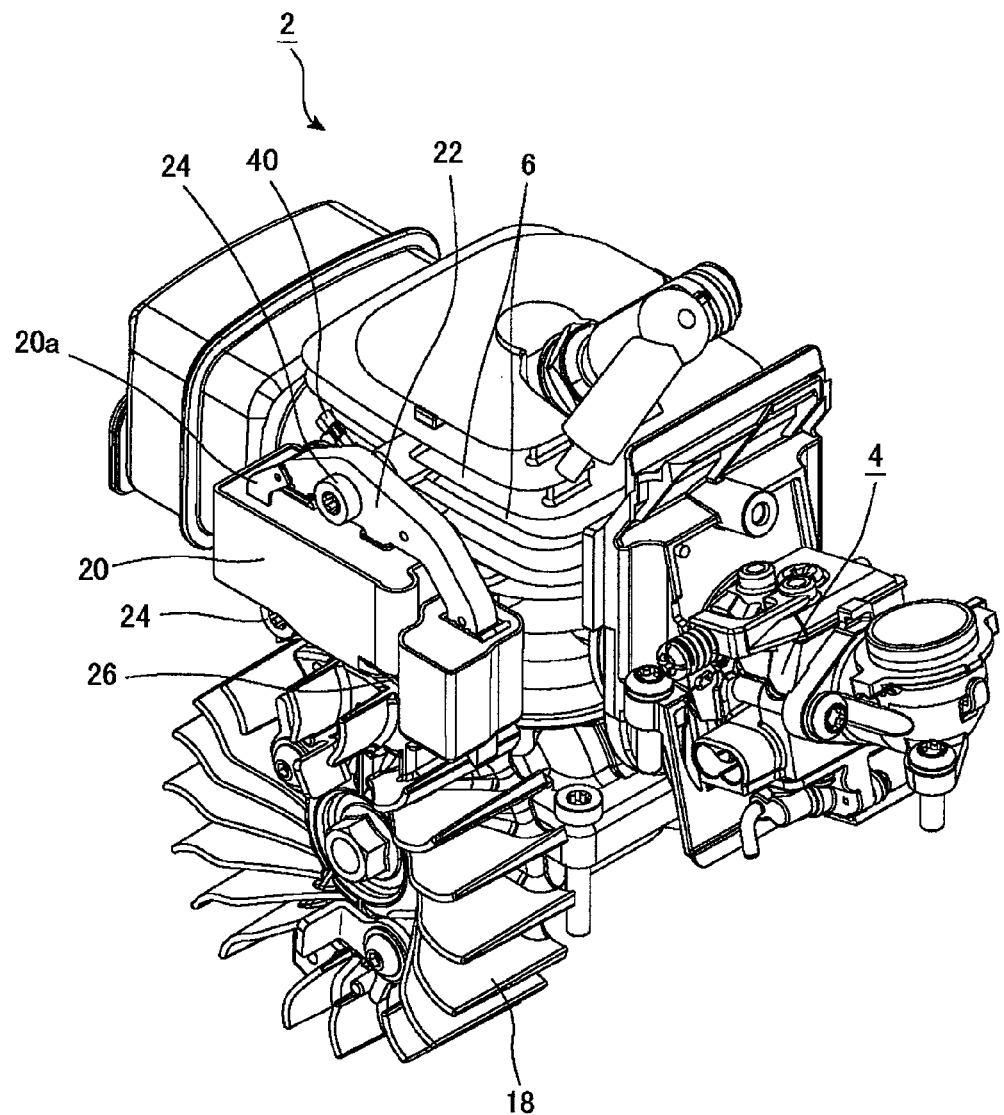
FIG. 2 shows a portion of the portable working machine in FIG. 1 where an engine body and, in relation to the engine body, a control unit are arranged.
Figure 3:
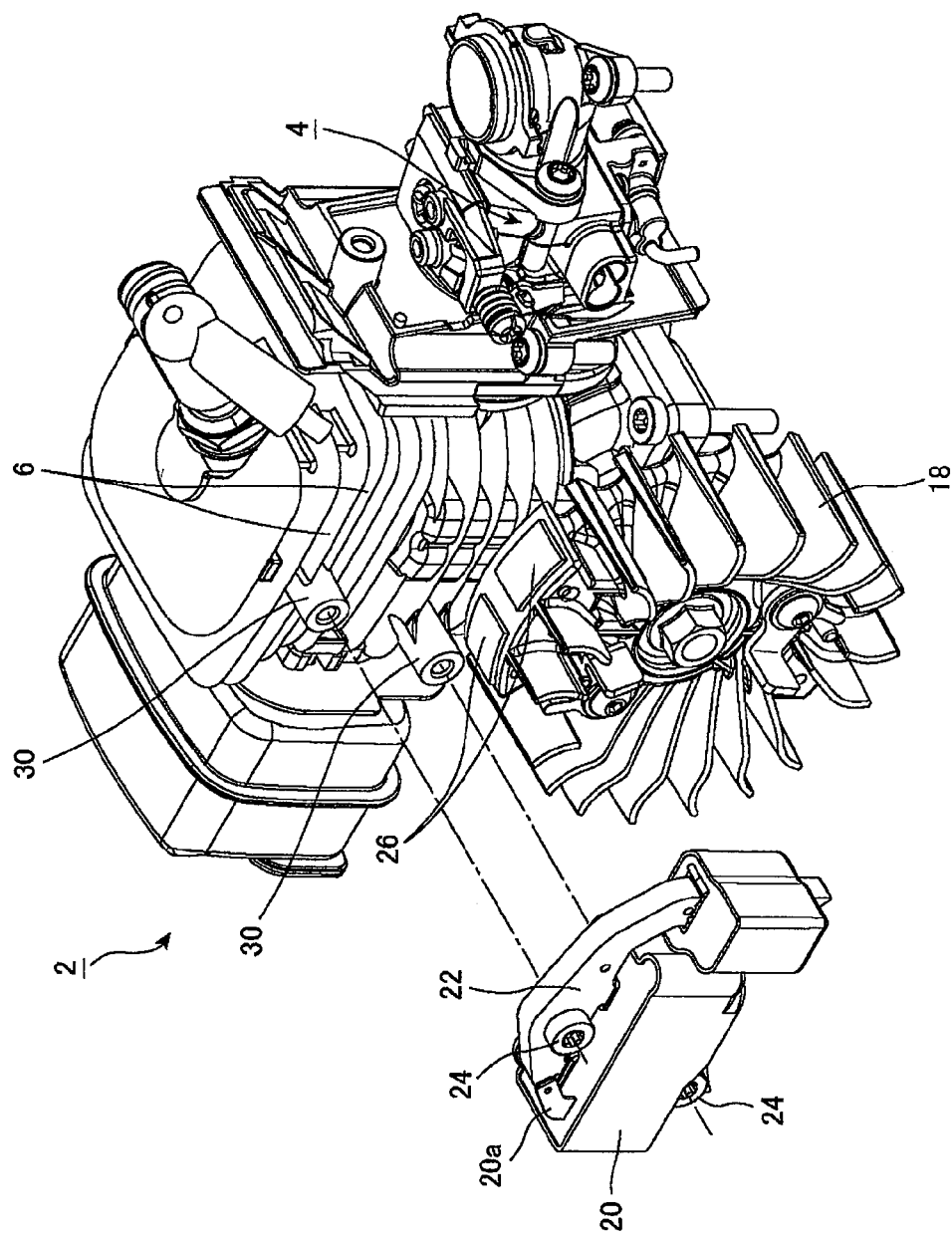
FIG. 3 is an exploded view corresponding to FIG. 2.
Figure 4:
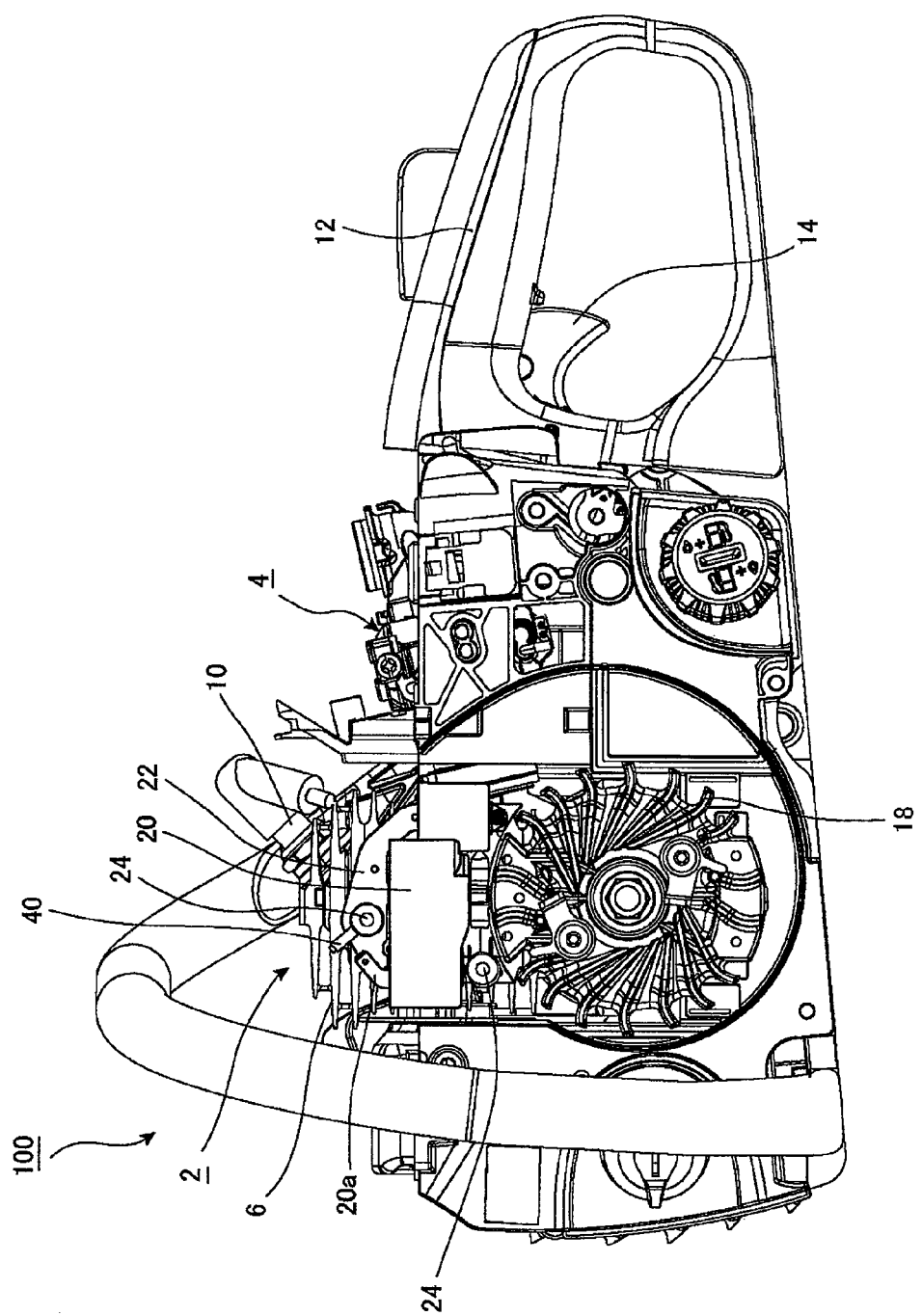
FIG. 4 is a side view of the drive portion of the portable working machine to which the present invention is applied, and corresponds to FIG. 1.

Reference numeral 20 denotes an electronic control unit. The electronic control unit 20 is covered with a removable engine cover. The control unit 20 includes a microcomputer encapsulated in a resin. FIG. 2 is an enlarged view showing the electronic control unit 20 and its vicinity. FIG. 3 is a side view of the engine body 2 with the carburetor 4 of the working machine in FIG. 1 in which the control unit 20 is removed from the engine body 2. FIG. 4 is a side view of the drive portion 100 in FIG. 2.

The electronic control unit 20 is supported by a base plate 22. The base plate 22 is formed of a ferrous metal. Referring to FIG. 4, the electronic control unit 20 is fixed to the cylinder portion 8 via the base plate 22 by using two bolts 24. The bolts 24, as is known, have threads. The electronic control unit 20 is positioned relative to the fan rotor 18 when fixed to the cylinder portion 8.

Figure 5:
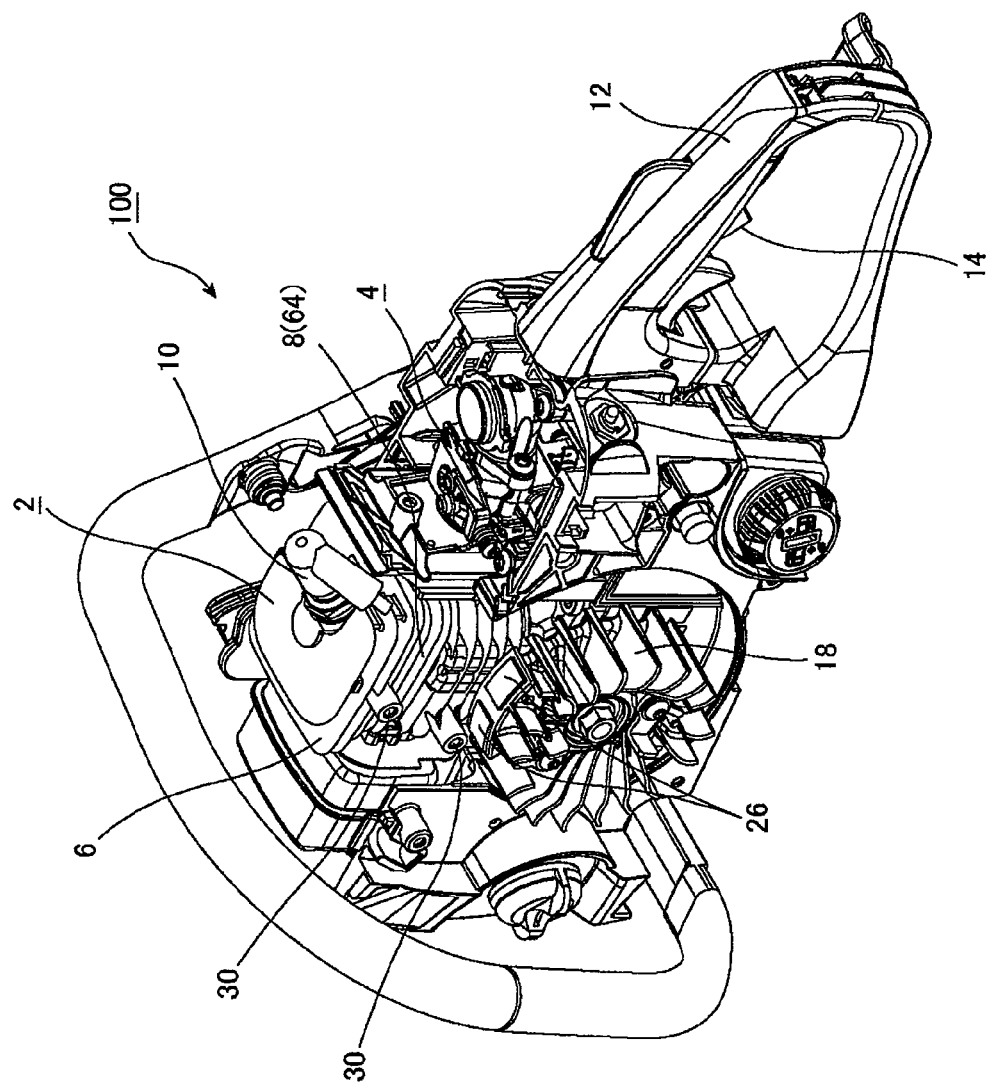
FIG. 5 is a perspective view of the drive portion of the portable working machine with the control unit removed from the machine, and corresponds to FIG. 1.
Figure 8:
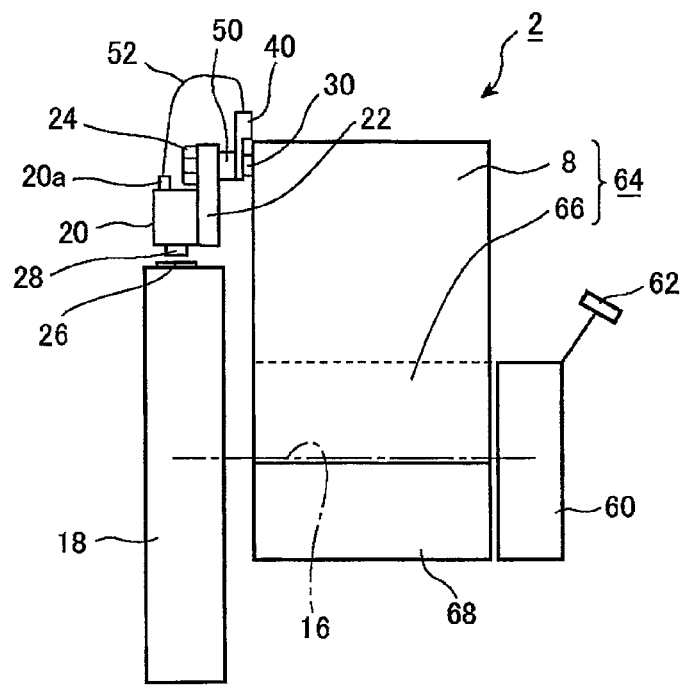
FIG. 8 is an illustration for describing the outline of the portable working machine in the embodiment.

Referring to FIGS. 3, 5, and 8, the fan rotor 18 has plate-like magnets 26 embedded on an outer circumferential surface thereof. On the other hand, the control unit 20 has an iron core 28 (FIG. 8) extending toward the outer circumferential surface of the fan rotor 18. The electronic control unit 20 is positioned such that a clearance between an end surface of the iron core 28 and the plate-like magnets 26 has a predetermined distance.

The magnets 26 arranged on the rotating fan rotor 18 and the iron core 28 located adjacent to the magnets 26 partially form a power generating mechanism. Electric power is generated as the engine body 2 starts operation, and the electronic control unit 20 is operated upon receiving the electric power.

Reference numerals 30 in FIGS. 3, 5, 8, and 9 each denotes a boss. Each boss 30 has a threaded hole. The two bosses 30 each receive the corresponding bolt 24. The electronic control unit 20 is fixed to the cylinder portion 8 of the cylinder block 64 by using the two bosses 30.

Figure 6:
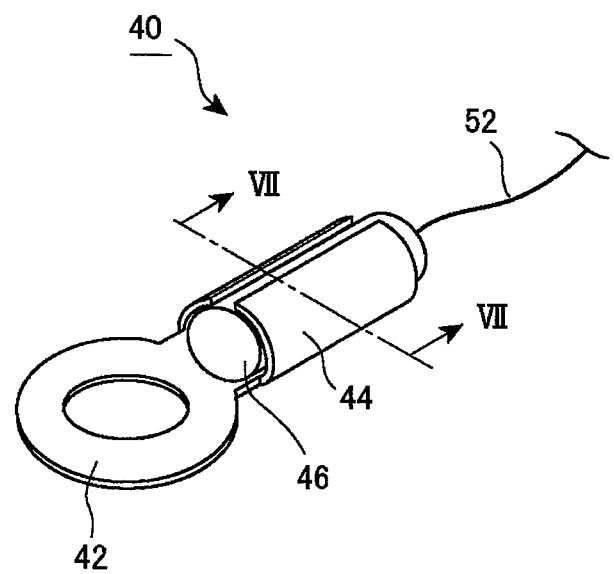
FIG. 6 is a perspective view of a temperature sensor component included in an embodiment.
Figure 7:
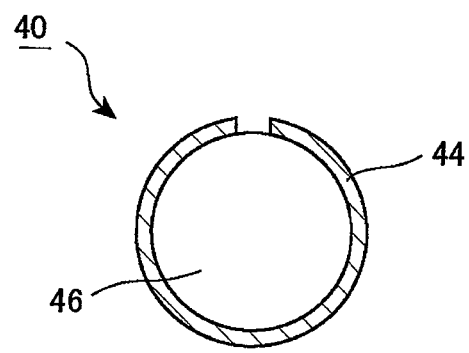
FIG. 7 is a cross-sectional view of the temperature sensor component taken along the line VII-VII in FIG. 6.

Reference numeral 40 in FIG. 2 denotes a temperature sensor component. FIG. 6 shows a temperature sensor component 40. The temperature sensor component 40 includes a flat metal terminal or a washer 42. FIG. 7 is a cross-sectional view taken along the line VII-VII in FIG. 6. The washer 42 is made of a heat transfer material, typically, made of metal. Modifications of the washer 42 shown in the figure may include a Y-shaped terminal.

Referring to FIG. 6, the heat transfer washer 42 includes a slitted tube or at least a pair of facing claws 44. A cylindrical sensor body 46 is inserted into the slitted tube or facing claws 44 and the sensor body 46 is fixed as the slitted tube or facing claws 44 is deformed. That is, the temperature sensor component 40 is constituted by the heat transfer washer 42 with the slitted tube or facing claws 44 and the sensor body 46 fixed to the slitted tube or facing claws 44.

The temperature sensor component 40 transfers an engine temperature to the sensor body 46 through the heat transfer washer 42. The engine temperature detected by the sensor body 46 is supplied to the electronic control unit 20.

Figure 9:
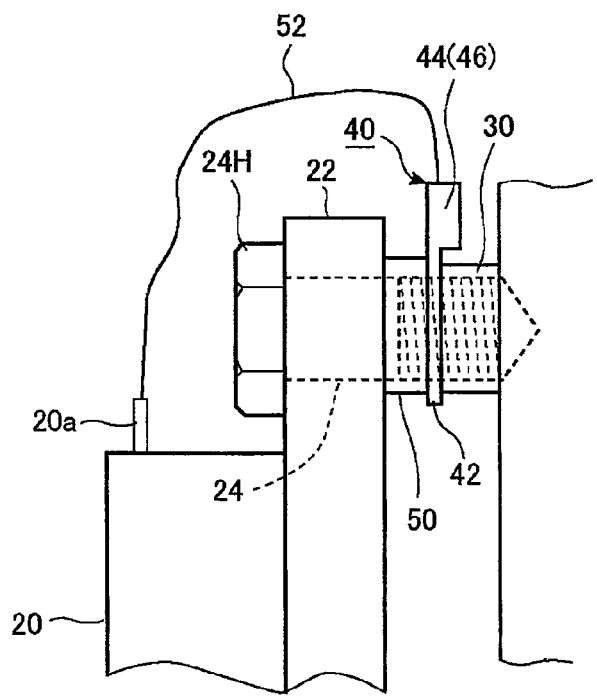
FIG. 9 shows a relevant portion taken from FIG. 8.

FIG. 8 is an illustration for describing a mounting portion for the temperature sensor component 40. The temperature sensor component 40 is preferably arranged at one of the two bosses 30 for fixing the electronic control unit 20 that is the closest to the control unit 20. FIG. 9 is an enlarged view of a relevant portion in FIG. 8. Referring to FIGS. 8 and 9, the heat transfer washer 42, a heat insulating sleeve 50, and the base plate 22 are positioned on the boss 30 in this order. The heat transfer washer 42, the heat insulating sleeve 50, and the base plate 22 are fixed to the boss 30 by the common bolt 24. In other words, starting from the boss 30 side, the heat transfer washer 42, the heat insulating sleeve 50, and the base plate 22 are arranged in this order between a head 24H of the bolt 24 and the boss 30.

Direct transfer of the heat of the engine body 2 to the base plate 22 (the control unit 20) is inhibited by interposing the heat insulating sleeve 50 between the base plate 22 and the boss 30.

A lead wire 52 extended from the sensor body 46 is connected to a terminal 20a of the electronic control unit 20. In a modified embodiment, the sensor body 46 and the control unit 20 may be connected together with an additional wire.

Reference numeral 60 shown in FIG. 8 denotes a recoil starter. As is well known, an operator pulls up with his/her hand a recoil grip or an operating member 62 associated with the recoil starter 60 for starting up the engine body 2.

FIG. 8 also shows that the cylinder block 64 is constituted by the cylinder portion 8 and an upper crankcase portion 66. A lower crankcase 68 is fixed to the upper crankcase portion 66. As is well known, the upper crankcase portion 66 and the lower crankcase 68 together form a crankcase (not shown). A piston (not shown) is arranged in the cylinder portion 8 such that the piston is reciprocable, and the piston forms a combustion chamber.

According to the above embodiment, the temperature sensor component 40 is fixed as in contact with the boss 30 integrally formed at the cylinder portion 8. As a result, the temperature sensor component 40 has excellent responsivity. In addition, the configuration achieves great ease of assembly and maintenance of the temperature sensor component 40. The maintenance includes replacement of the temperature sensor component 40.

The boss 30 is originally provided at the cylinder block 64 for fixing the control unit 20. Thus, because the temperature sensor component 40 and the electronic control unit 20 are fastened together by the common bolt 24 to the same boss 30, the lead wire 52 connecting the sensor body 46 and the control unit 20 may be short. In addition, because the lead wire 52 can be routed without crossing other members (e.g., a casing) by locating the sensor body 46 adjacent to the control unit 20, there is no need to mind an interference problem between the lead wire 52 and any component that could cause accidental disconnection of the lead wire 52. Further, because the entire lead wire 52 from one end to the other end thereof can be exposed by removing the engine cover, the temperature sensor component 40 can be replaced easily, for example, when it fails.

REFERENCE SIGNS LIST

100 Drive portion of portable working machine
2 Engine body
4 Carburetor
6 Air-cooling fin
8 Cylinder portion of cylinder block
18 Fan rotor
20 Electronic control unit
20a Terminal of control unit
22 Base plate of control unit
24 Bolt
26 Magnet
28 Iron core
30 Boss
40 Temperature sensor component
42 Heat transfer washer (terminal)
44 Slitted tube or at least a pair of facing claws
46 Sensor body
52 Lead wire extended from sensor body

What is claimed is:

1. A portable working machine including a control unit controlling the portable working machine using an engine temperature as a parameter, the portable working machine comprising:
    an air-cooled engine body;
    a boss formed at a cylinder portion of a cylinder block of the engine body;
    the control unit fixed by a bolt fastened to the boss; and
    a temperature sensor component including a heat transfer terminal, the temperature sensor component detecting the engine temperature of the engine body and supplying the detected engine temperature to the control unit,
    wherein the heat transfer terminal is interposed between the boss and the control unit, and the heat transfer terminal and the control unit are fixed to the boss by the bolt,
    wherein the control unit includes a base plate supporting the control unit, and
    the control unit is fixed to the boss via the base plate.

2. The portable working machine of claim 1, wherein the engine body is formed by a single cylinder 2-stroke internal combustion engine.

3. The portable working machine of claim 2, wherein
    the engine body has a fan rotor fixed to a crankshaft and a magnet arranged on an outer circumferential surface of the fan rotor,
    the control unit has an iron core extended from the control unit toward the fan rotor, and
    the magnet and the iron core partially form a power generating mechanism.

4. The portable working machine of claim 1, wherein a heat insulating sleeve is interposed between the base plate and the heat transfer terminal.

5. The portable working machine of claim 4, wherein
    the engine body has a fan rotor fixed to a crankshaft and a magnet arranged on an outer circumferential surface of the fan rotor,
    the control unit has an iron core extended from the control unit toward the fan rotor, and
    the magnet and the iron core partially form a power generating mechanism.

6. The portable working machine of claim 1, wherein
    the engine body has a fan rotor fixed to a crankshaft and a magnet arranged on an outer circumferential surface of the fan rotor,
    the control unit has an iron core extended from the control unit toward the fan rotor, and
    the magnet and the iron core partially form a power generating mechanism.

7. The portable working machine of claim 1, wherein
    the engine body has a fan rotor fixed to a crankshaft and a magnet arranged on an outer circumferential surface of the fan rotor,
    the control unit has an iron core extended from the control unit toward the fan rotor, and
    the magnet and the iron core partially form a power generating mechanism.

8. The portable working machine of claim 1, wherein the heat transfer terminal is a heat transfer washer.

9. A portable working machine including a control unit controlling the portable working machine using an engine temperature as a parameter, the portable working machine comprising:
    an air-cooled engine body, wherein the engine body has a fan rotor fixed to a crankshaft and a magnet arranged on an outer circumferential surface of the fan rotor;
    a boss formed at a cylinder portion of a cylinder block of the engine body;
    the control unit fixed by a bolt fastened to the boss, wherein the control unit has an iron core extended from the control unit toward the fan rotor, and the magnet and the iron core partially form a power generating mechanism; and
    a temperature sensor component including a heat transfer terminal, the temperature sensor component detecting the engine temperature of the engine body and supplying the detected engine temperature to the control unit,
    wherein the heat transfer terminal is interposed between the boss and the control unit, and the heat transfer terminal and the control unit are fixed to the boss by the bolt.

10. The portable working machine of claim 9, wherein the engine body is formed by a single cylinder 2-stroke internal combustion engine.

11. The portable working machine of claim 10, wherein
    the control unit includes a base plate supporting the control unit, and
    the control unit is fixed to the boss via the base plate.

12. The portable working machine of claim 11, wherein a heat insulating sleeve is interposed between the base plate and the heat transfer terminal.

13. The portable working machine of claim 9, wherein the heat transfer terminal is a heat transfer washer.

* * * * *